(12) United States Patent
Cho et al.

(10) Patent No.: US 10,744,705 B2
(45) Date of Patent: Aug. 18, 2020

(54) DEVICE FOR INSTALLING A SCREEN PROTECTOR TO AN ELECTRONIC DEVICE

(71) Applicant: SPIGEN KOREA CO., LTD., Seoul (KR)

(72) Inventors: Jae Hong Cho, Seoul (KR); Sang Hyup Woo, Seoul (KR); Youngkwang Hyun, Seoul (KR); Dong Kyung Choi, Seoul (KR)

(73) Assignee: SPIGEN KOREA CO., LTD., Seoul (KR)

( * ) Notice: Subject to any disclaimer, the term of this patent is extended or adjusted under 35 U.S.C. 154(b) by 0 days.

(21) Appl. No.: 16/578,233

(22) Filed: Sep. 20, 2019

(65) Prior Publication Data
US 2020/0094467 A1    Mar. 26, 2020

Related U.S. Application Data

(60) Provisional application No. 62/734,919, filed on Sep. 21, 2018.

(51) Int. Cl.
| | |
|---|---|
| *B29C 63/00* | (2006.01) |
| *G11B 23/03* | (2006.01) |
| *H04M 1/02* | (2006.01) |
| *G06F 1/16* | (2006.01) |
| *B29L 31/34* | (2006.01) |

(52) U.S. Cl.
CPC ........ *B29C 63/0004* (2013.01); *G06F 1/1656* (2013.01); *G11B 23/0316* (2013.01); *H04M 1/0266* (2013.01); *B29C 2063/0008* (2013.01); *B29L 2031/3437* (2013.01); *B29L 2031/3475* (2013.01); *G06F 2200/1634* (2013.01)

(58) Field of Classification Search
USPC .......................................... 156/247, 249, 289
See application file for complete search history.

(56) References Cited

U.S. PATENT DOCUMENTS

| | | | | |
|---|---|---|---|---|
| 8,675,353 | B1 * | 3/2014 | Alonzo | G06F 1/1628 361/679.01 |
| 2013/0237296 | A1 * | 9/2013 | Chen | B29C 63/0004 455/575.8 |
| 2015/0277502 | A1 * | 10/2015 | Witham | G06F 1/1626 156/249 |

OTHER PUBLICATIONS

"Smart Touch iPhone 6 Tempered Glass Screen Protector", https://www.youtube.com/watch?v=QcK_LoEGHZ8, Published on Sep. 8, 2015.

(Continued)

*Primary Examiner* — Sing P Chan
(74) *Attorney, Agent, or Firm* — Heedong Chae; Lucem, PC

(57) ABSTRACT

A device for installing a screen protector to an electronic device that includes a screen protector unit having a release film, a screen protector, and a protection film wherein the release film has a release tab, the protection film has at least one protection tab where the protection tab includes a hole formed therein; a tray having a panel, at least one alignment protrusion that fits the hole, a guide hole to allow external pressure to be applied onto the screen protector unit when the screen protector unit and the electronic device are received in the tray; and an adhesive strip, via the guide hole, further secures the screen protector unit to the tray. Also included is a method to using the device to install the screen protector to the screen of the electronic device.

19 Claims, 14 Drawing Sheets

(56) References Cited

OTHER PUBLICATIONS

"Easy applicator for tempered glass screen protector", https://www.youtube.com/watch?v=0I5BQVSkdmQ, Published on Jul. 13, 2015.

\* cited by examiner

DEVICE FOR INSTALLING A SCREEN PROTECTOR TO AN ELECTRONIC DEVICE

CROSS-REFERENCE TO RELATED APPLICATIONS

This application claims priority to U.S. provisional patent application No. 62/734,919, filed on Sep. 21, 2018, the disclosure of which is incorporated herein by reference in its entirety.

FIELD OF THE INVENTION

The present invention relates to a device for installing a screen protector to an electronic device, and more particularly, to a device for installing a screen protector to a screen of a portable electronic device.

BACKGROUND OF THE INVENTION

Portable electronic devices, such as mobile phones, smart phones, tablet computers and the like are ubiquitous and indispensable in the modern world. These portable electronic devices have become popular and are widely used for communication, entertainment, education, business and other purposes. As their convenient form factors demonstrate, the above-mentioned devices are intended to be carried or moved about and, as such, these devices carry the risk of being accidently dropped, hit, or scratched. Furthermore, the screens of these devices, which are often made of a type of tempered glass (e.g. alkali-aluminosilicate sheet glass, commonly referred to as "Gorilla Glass," and its close equivalents) that may shatter or crack when sufficient external force (blunt or sharp) is applied against them. As indicated earlier, this type of damage may occur from accidental drops or impacts while operating or carrying around the electronic device, which may subsequently render the electronic device difficult to use or inoperable altogether. To protect the screens of these portable electronic devices, screen protectors have been introduced and been popularized in connection with electronic devices such as cell phones, smart phones, tablet computers and the like.

Screen protectors for portable devices are often made from plastic or glass (the latter often tempered glass) with each of the materials having respective pros and cons that often relate to their respective durability, aesthetic appearance, and resistance to blunt and sharp impact forces they face when installed on the screens of portable electronic devices. The process of installing these screen protectors to portable electronic devices is often cumbersome and fraught with difficulty. For example, during manual installation of a screen protector to a screen of a portable electronic device, misalignment or misapplication of the screen protector to the screen of an electronic device often results, which may leave behind sticky residue from an adhesive layer that is often included in screen protectors, or leave an area of the screen exposed for potential damage. Or, when trying to correct the misalignment, a user may leave behind their own residue, e.g. oils from their fingers left behind as fingerprints, on the screen of the portable electronic devices that will remain visible when the user subsequently aligns the screen protector properly.

The present invention is directed to overcome such disadvantages and provide a number of other advantages by using a device (10) to install a screen protector (22) to a screen (110) of an electronic device (100).

SUMMARY OF THE INVENTION

The present invention contrives to solve the disadvantages of the prior art. The present invention is directed to a device for installing a screen protector to an electronic device, the device including a screen protector unit and a tray, the tray constructed from a single-mould. The screen protector unit includes a release film, a screen protector, and a protection film, wherein the release film has a release tab and the protection film has at least one protection tab, the first protection tab having a first mating hole. The tray includes a ridge formed by a rib and a flange, and side walls to receive the screen protector unit and the electronic device respectively, wherein the tray further includes at least one alignment protrusion; the alignment protrusion fits in the mating hole of the protection tab.

The object of the present invention is to provide a device for installing a screen protector to an electronic device. The device includes a screen protector unit and a tray. The screen protector unit includes a release film, the screen protector, and a protection film wherein the release film and the protection film are removably attached to opposite sides of the screen protector. The tray includes a panel on which the screen protector unit is placed; side walls to help align a screen of the electronic device to the screen protector wherein the side walls are constructed to project from the panel such that the electronic device fits in between the side walls; and a first protrusion projecting from the panel, wherein the protection film includes a first protection tab extending beyond a boundary of the screen protector and wherein the first protection tab includes a first mating hole formed therein such that the first protrusion fits in the first mating hole.

Another object of the present invention is to provide a method for using a device to install a screen protector to an electronic device wherein the device includes a screen protector unit and a tray wherein the screen protector unit includes a release film that has at least one release tab, a screen protector, a protection film having at least one protection tab wherein the release film and the protection film are removably attached to opposite sides of the screen protector, wherein the first protection tab includes a mating hole, and wherein the tray includes a panel, side walls, and a protrusion projecting from the panel. The method includes the steps of placing the screen protector unit on the panel of the tray, mating the first protrusion with the mating hole of the first protection tab such that the screen protector unit is aligned and received in tray, removing the release film from the screen protector by pulling from the release tab, directing the screen protector of the device to a screen of the electronic device such that the electronic device is received in the side walls of the tray, separating the tray from the protection film such that the protection film remains removably attached to the screen protector, and using the first protection tab to separate the protection film from the screen protector.

The advantages of the present invention are: (1) Proper alignment of the screen protector to the tray due to the presence of alignment protrusions on the panel of the tray prior to packaging the device; (2) at least one protrusion associated with at least one mating hole to prevent confusion to manufacturer and/or the consumer with regards to the proper orientation of the screen protector to the tray by guiding or directing an orientation of the screen protector unit, which includes the screen protector, to the tray; (3) alignment protrusions fit in mating holes to maintain the screen protector unit, which includes the screen protector, secured and in place in the tray; (4) an adhesive strip that further maintains the screen protector unit, which includes the screen protector, secured and in place in the tray; (5) indentation structures on the tray that enables the tray to substantially fit to the sides of the electronic device having buttons; (6) the ability to stack trays for storage and/or packaging; (7) convenience and ease of use when using the device to install a screen protector to an electronic device by nearly eliminating the need for manual alignment of the screen protector to the electronic device; and (8) fewer components required to install a screen protector to a screen of an electronic device.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
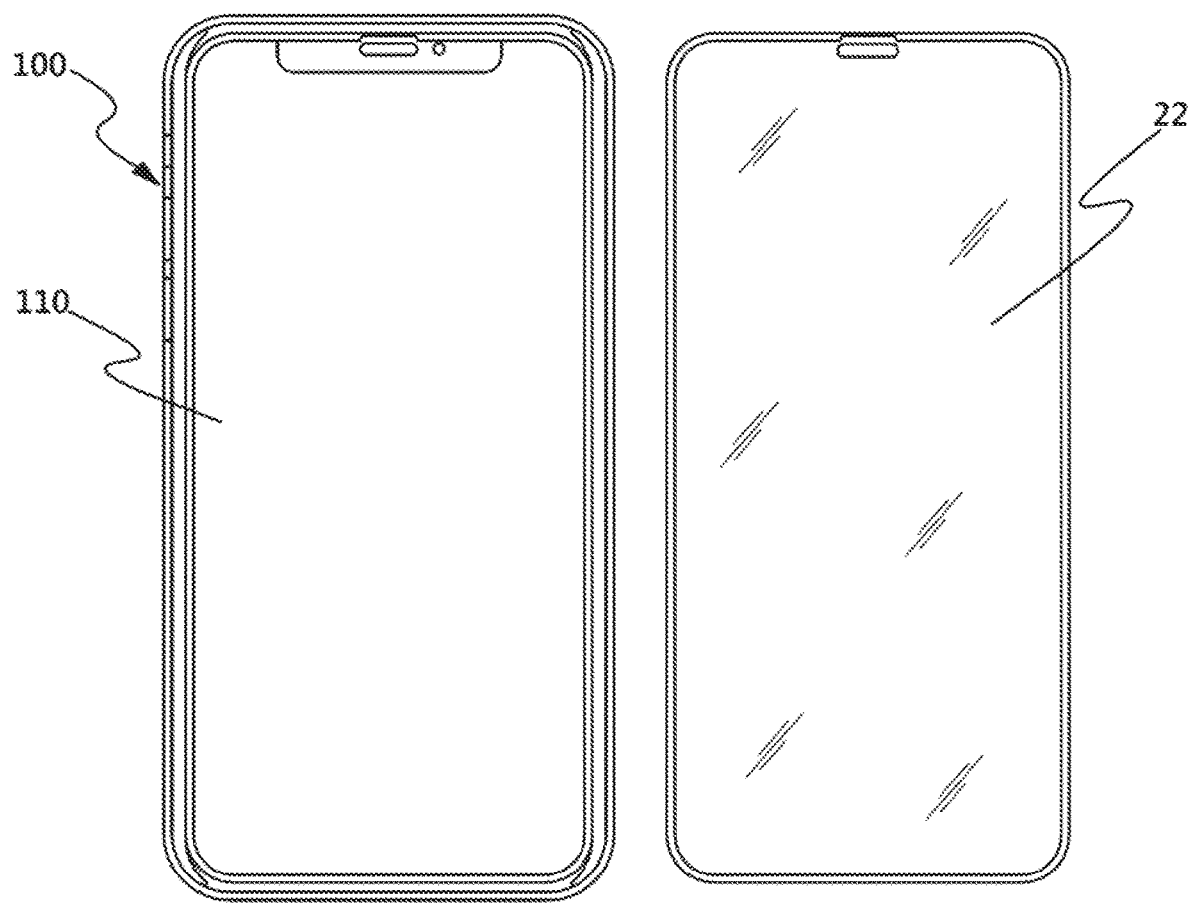
FIG. 1 shows a portable electronic device, here a smart phone, and a screen protector.
Figure 2:
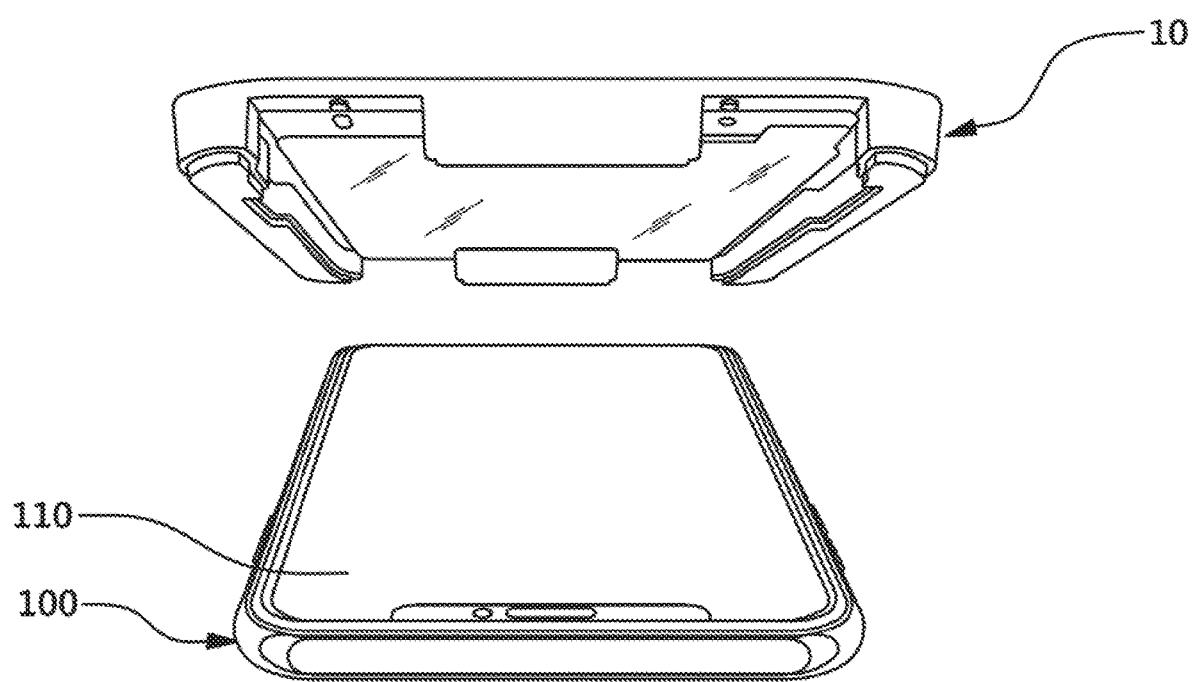
FIGS. 2-3 show the device as it relates to a smart phone.
Figure 3:
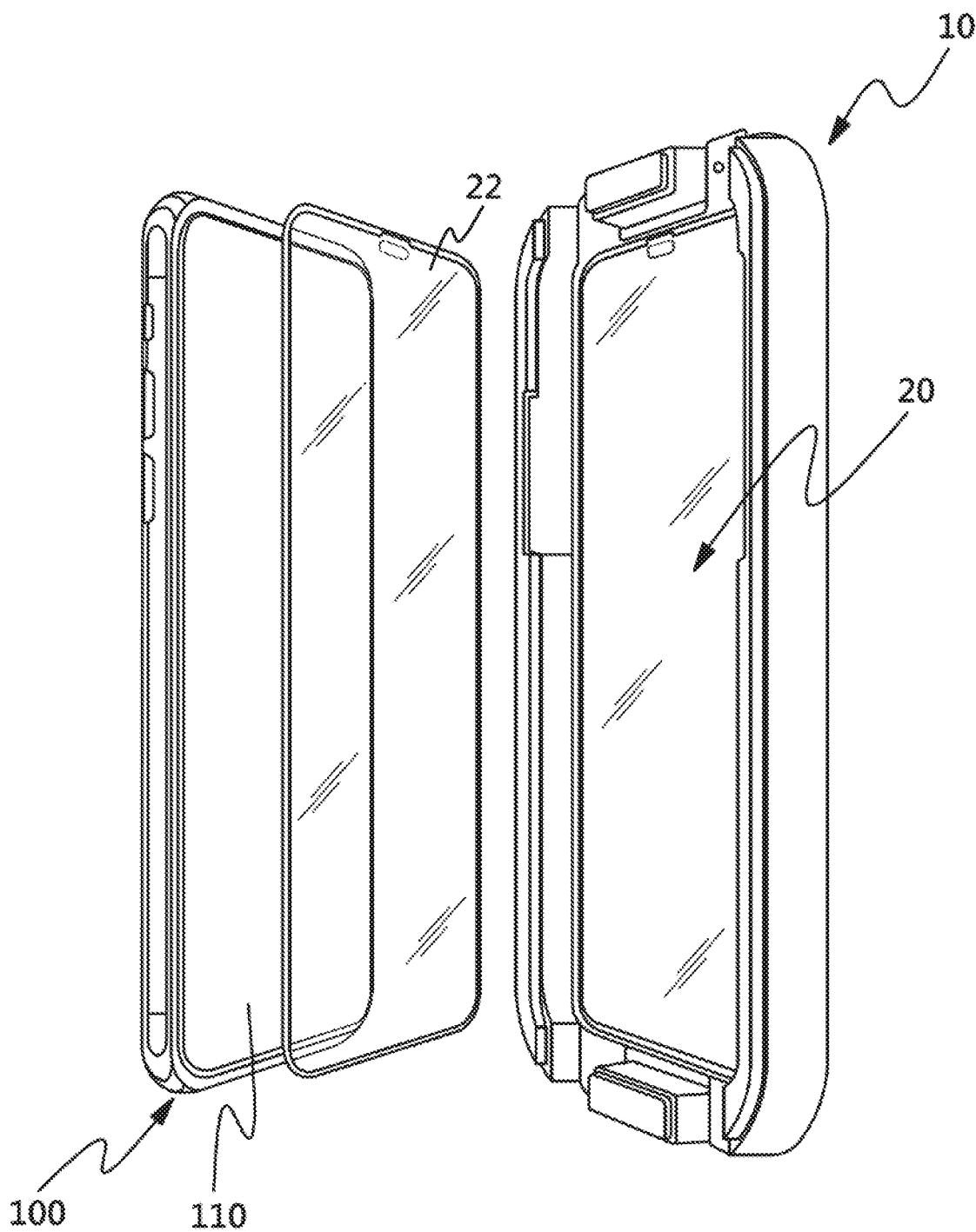
Figure 4:
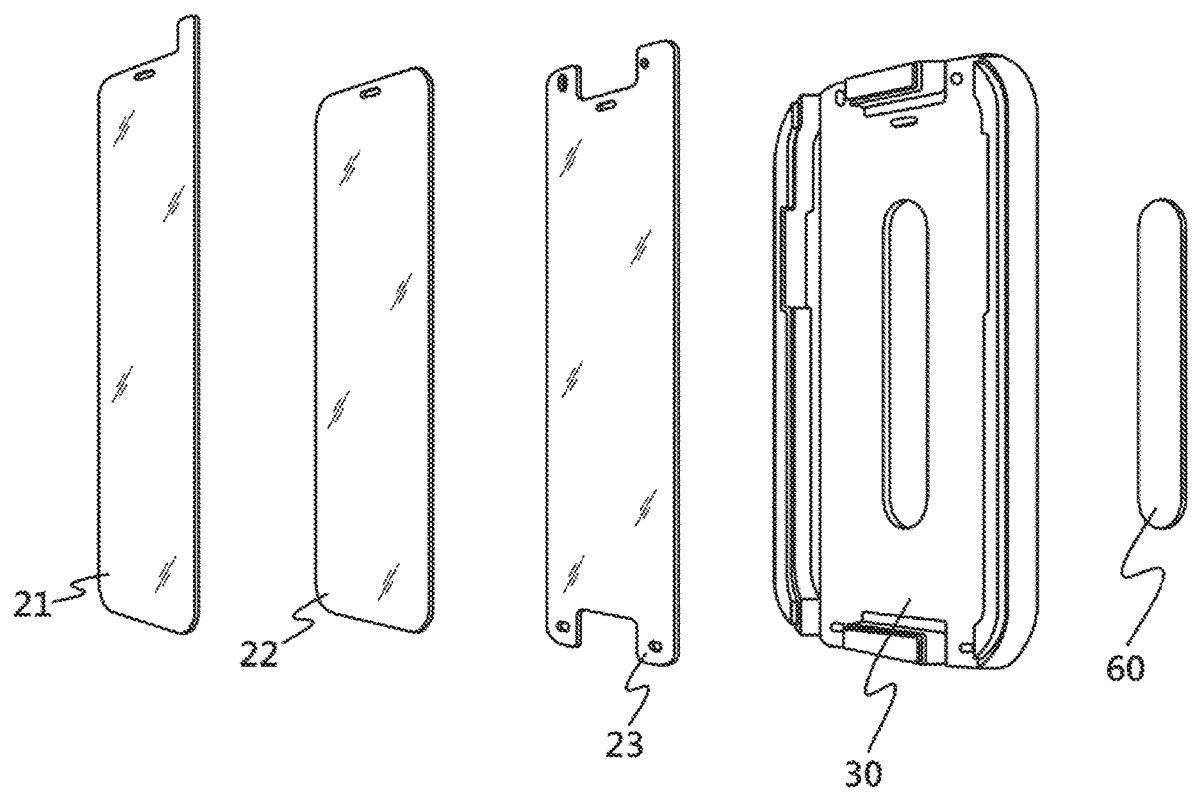
FIG. 4 shows the screen protector unit having a release film, a screen protector, and a protection film.
Figure 5:
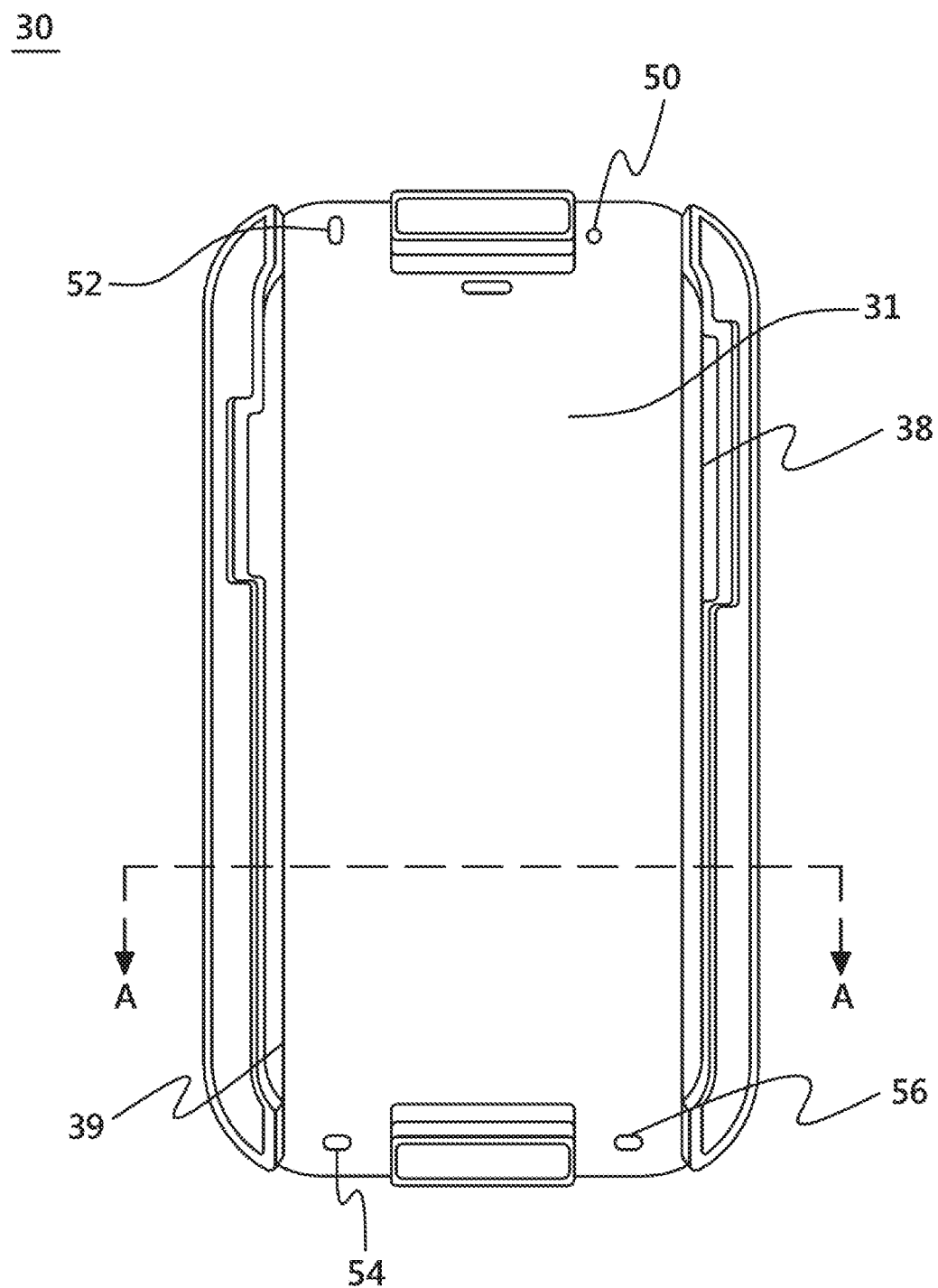
FIG. 5 shows a perspective view of the tray of the device.
Figure 6:
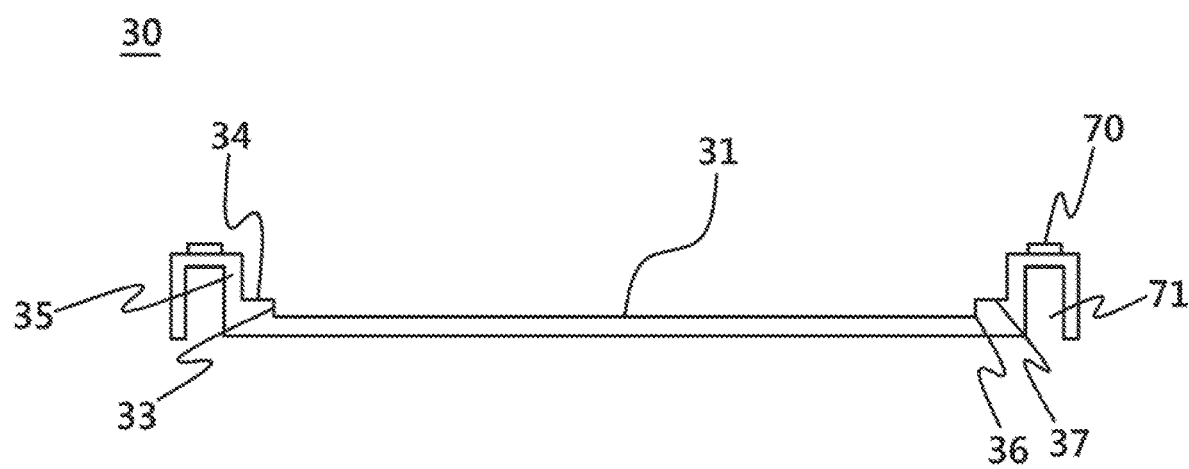
FIG. 6 shows a schematical cross-sectional view of the tray.

FIG. 1 shows an electronic device (100) and its screen (110) compared to a screen protector (22) that is sized to be installed onto the screen (110). FIGS. 2 and 3 show a device (10) for installing a screen protector (22) to an electronic device (100). FIGS. 2-5 show the device (10) comprising a screen protector unit (20) and a tray (30). As shown in FIGS. 3 and 4, the screen protector unit (20) comprises a release film (21), the screen protector (22), and a protection film (23), wherein the screen protector (22) is constructed to cover a screen (110) of the electronic device (100). FIGS. 3 and 5 show the tray (30) having a shape and structural features constructed to receive the screen protector unit (20) and the electronic device (100). The shape of the tray (30), as shown in FIG. 5, is preferably that of a rounded rectangle. Alternatively, the tray may adopt other shapes including those that are more rectangular or more rounded, e.g. obround for the latter. FIG. 5 and FIG. 6 (the latter a schematical cross-sectional view of the area denoted by "A" of FIG. 5) show the tray (30) comprising a panel (31) that substantially covers the screen protector unit (20); a rib (33) projecting from the panel (31); a flange (34) extending outwardly from the rib (33) wherein the rib (33) and flange (34) together form a side ridge (39); side walls (35) to help align a screen (110) of the electronic device (100) to the screen protector (22) wherein the side walls (35) are constructed to project from the panel (31) such that the electronic device (100) fits in between the side walls (35) to help align the screen (110) of the electronic device (100) to the screen protector (22). The side walls (35) in every embodiment of the invention include a single wall (35) such that the side walls (35) mean at least one side wall (35). The side walls (35) can include at least one indentation structure (38) such that a side and a button of the electronic device can fit in the indentation structure (38), as the sides of the electronic device typically having buttons, various ports (e.g. charging, connectivity, and the like), and sometimes a slot for digital accessories such as a digital pen and the like. Furthermore, the tray (30) is manufactured from a single-molding constructed from plastics or other polymers. Despite the possibility that the tray (30) being of any color, it is preferable that the tray (30) is substantially transparent or substantially translucent.

FIG. 5 shows the tray (30) also having a first alignment protrusion (50) located on the panel (31). The first alignment protrusion (50) can be a protrusion that arises from the panel (31). The first alignment protrusion (50), and any additional alignment protrusions, have a cross-sectional area that can substantially adopt any the profile of any 2D geometrical shape including, but not limited to, the following shapes: circular, longitudinal, triangular, obround, elliptical, polyhedral, prismatic, and the like. Additionally, the first alignment protrusion, and any additional alignment protrusions, can adopt any 3D geometrical shapes including, but not limited to the following shapes: spherical, semi-spherical, prismatic, conical, frustoconical, cylindrical, cubic, cuboidal, pyramidal, and the like. Alternatively, a first alignment protrusion (50) can be multiple protrusions of varied geometrical shapes and configurations. Alternatively, an alignment protrusion (50) can arise from a location or multiple locations on the panel (31) and extend to and merge with the side walls forming a raised bar-like structure. Preferably, the first alignment protrusion (50) has a cross-sectional area adopting a substantially circular profile such that the first alignment protrusion (50) is substantially cylindrical in shape as shown in FIGS. 5 and 7F.

With respect to the screen protector (22) of the screen protector unit (20), the screen protector (22) includes a first side and a second side opposite to the first side, wherein the first side has an adhesive layer. The release film (21) detachably attaches to the first side of the screen protector (22). The protection film (23) includes a side having an adhesive layer, wherein the side of the protection film (23) with the adhesive layer detachably attaches to the second side of the screen protector (22). FIG. 4 shows the release film (21) further including a release tab (24) extending from the release film (21); alternatively, there may be an additional release tab to the release film (21), or that the release tab (24) can extend substantially coplanarly or substantially perpendicularly from the release film (21). Preferably, as shown in FIG. 4, the release tab (24) extends substantially coplanarly from the release film (21). The release film (21), protection film (23), release tab (24), and the first protection tab (251) are manufactured out of plastic or other polymers known in the art.

As further shown in FIG. 4, the protection film (23) includes a first protection tab (251), wherein the first protection tab (251) extends substantially coplanarly from the protection film (23) such that the first protection tab extends beyond a boundary of the screen protector (22). Furthermore, the first protection tab (251) includes a first mating hole (26) wherein the first protection tab (251) is sized to fit in the first mating hole (261). The first mating hole (261), and any additional mating holes, can adopt any configuration that allows the first mating hole (261) to couple, join, encircle, be filled with, or adapt to the corresponding first alignment protrusion (50), examples of first mating hole (261) configurations include, but is not limited to, hole(s), notch(es), hollow depressions, and the like. For example, where the first alignment protrusion (50) is a substantially cylindrical protrusion projecting from the panel (31), the first mating hole (261) can be a hole corresponding to the cylindrical protrusion that is the first alignment protrusion (251) or a hollow depression adapted to couple with the first alignment protrusion (251). The first alignment protrusion (50) fitting with its corresponding first mating hole (261), and any additional alignment protrusions and mating holes, help secure and position the screen protector unit (20), and consequentially the screen protector (22), to fit in the tray (30) in a proper orientation and alignment for the screen protector (22) to be properly installed on to the screen (110) of the electronic device (100). If the user tries to align and place the screen protector unit (20) to the tray (30) improperly, the first alignment protrusion (50) will not be in a position to fit in the first mating hole (261), which will prevent the screen protector (22) from securing its position to the tray (30); likewise with respect to the manufacture, as correct alignment of the screen protect unit (20) to the tray (30) ensures stable transporting of the device (10) to the market. The result of an improperly secured and positioned screen protector unit (20) is that it will be more likely to fall out from the tray. Thus, the first alignment protrusion (50) and its respective first mating hole (26) helps prevent user confusion with regards to using the device (10) to properly place the screen protector (22) onto the screen (110) of the electronic device (100), as well as, for the manufacturer, ease of transport of the device (10) to the marketplace.

As shown in FIG. 5, the tray (30) further includes a second alignment protrusion (52) on the second region of the panel (31), wherein the protection film (23) further comprises a second protection tab (252) wherein the second protection tab (252) extends coplanarly from the protection film (23) and wherein the second protection tab (252) includes a second mating hole (262) formed therein. As shown in FIG. 7B, the second alignment protrusion (52) is constructed to fit with the second mating hole (262). The first alignment protrusion (50) here may have a cross-sectional area that is substantially circular wherein the first alignment protrusion (50) fits in the first mating hole (261). The second alignment protrusion (52) protrudes the panel (31) wherein the second alignment protrusion (52) has a cross-sectional area that is substantially longitudinal and wherein the second alignment protrusion (52) fits with the second mating hole (262).

Alternatively, the tray (30) may further include a second alignment protrusion (52) projecting from the panel wherein the first protection tab (251) further includes a second mating hole (262) formed therein such that the second alignment protrusion (52) fits in the second mating hole (262). Protection tabs for all of the embodiments may include one or more mating holes formed therein. Preferably, as shown in FIG. 7B and described earlier, the protection film (23) further includes a second protection tab (252), wherein the second protection tab (252) includes the second mating hole (262), of which the second alignment protrusion (52) fits therein. The first alignment protrusion (50) and the first protection tab (251) with the first mating hole (261) can be on an opposite side of a first face of the tray (30) with the second alignment protrusion (52) and the second protection tab (252) with the second mating hole (262). Alternatively, and preferably, the first alignment protrusion (50) and the first protection tab (251) with the first mating hole is on a same side of the first face of the tray (30) with the second alignment protrusion (52) and the second protecting tab (252) with the second mating hole (262) as shown in FIG. 7B.

Figure 7A:
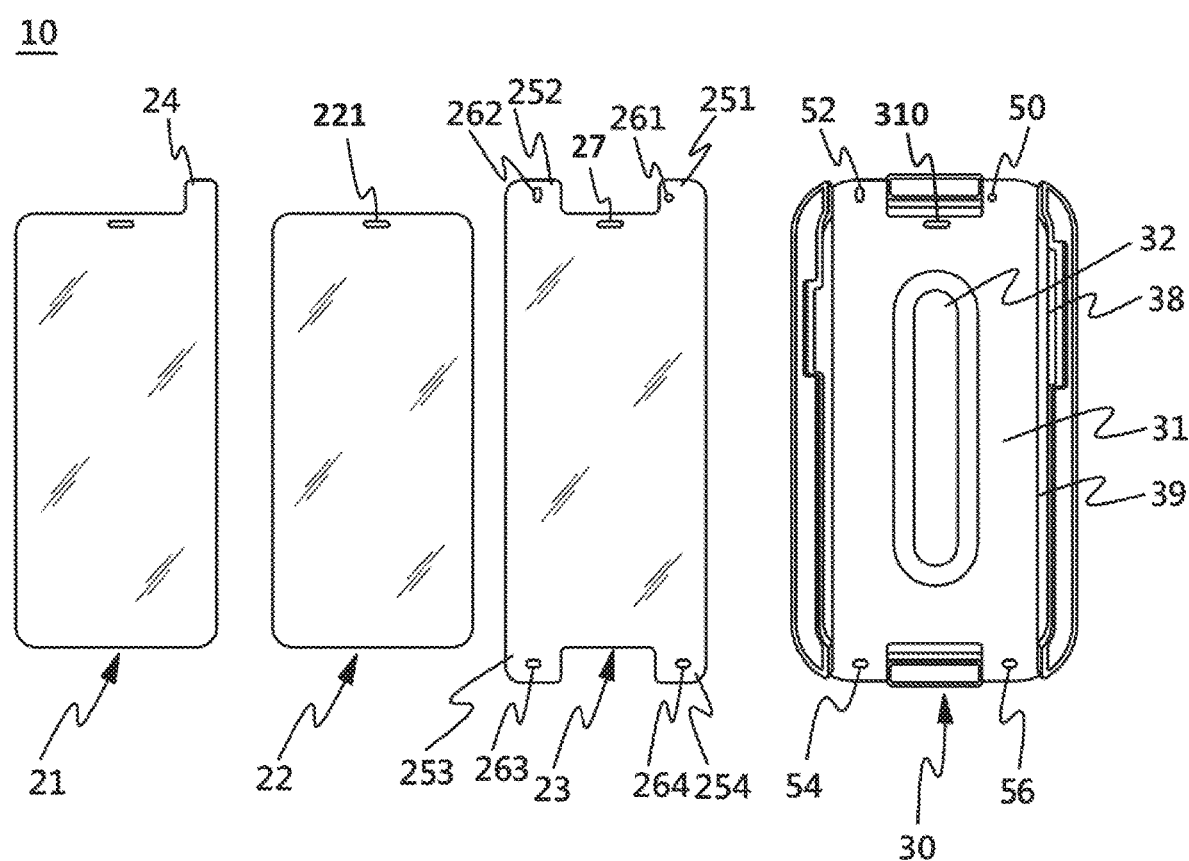
FIG. 7A shows the device where the screen protector, the release film, the protection film and the tray are displayed separately.
Figure 7B:
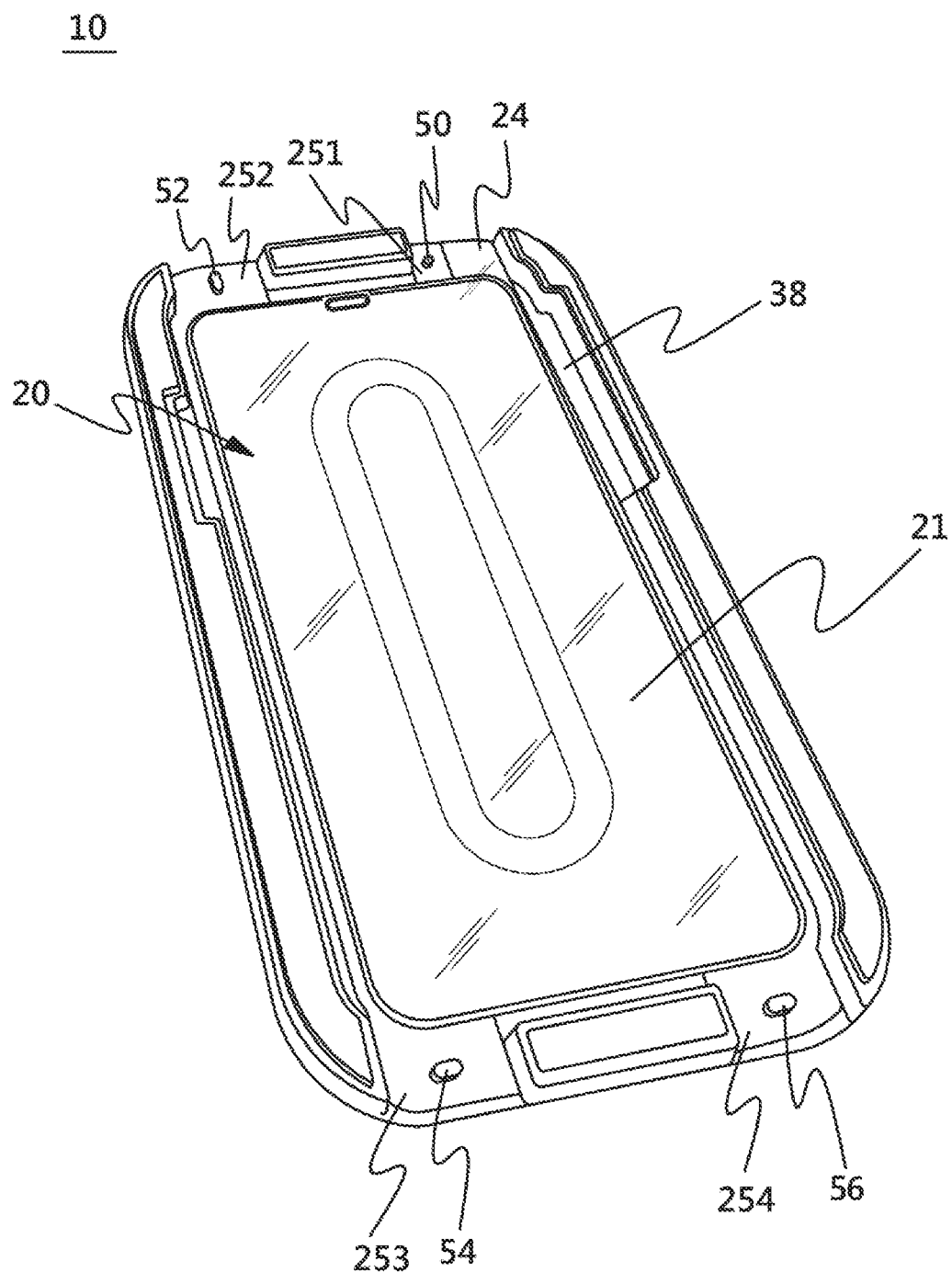
FIGS. 7B-7C show two front and rear perspective views of the device respectively.

Also shown in FIGS. 5 and 7A, the tray (30) of the device (10), wherein a portion of the side walls (35) is located between the first protrusion (50) and the second protrusion (52) and a second portion of the side walls (35) is located between the third protrusion (54) and the fourth protrusion (56). The portion of the side walls (35) is located between the first protection tab (251) and the second protection tab (252) of the screen protector unit (20) when the screen protector unit (20) is placed on the panel (31), and the second portion of the side walls (35) is located between the third protection tab (253) and the fourth protection tab (254) of the screen protector unit (20) when the panel (31) receives the screen protector unit (20) thereon.

As shown in FIG. 5, the tray (30) may further comprise a third alignment protrusion (54), wherein the protection film (23) further comprises a third protection tab (253). The third protection tab (253) extends coplanarly from the protection film (23) and the third protection tab (253) includes a third mating hole (263), wherein the third alignment protrusion (54) projects from the panel (31) wherein the third alignment protrusion (54) fits in the third mating hole (263). Preferably, the first alignment protrusion (50) has a cross-sectional area that is substantially circular, the second alignment protrusion (52) has a cross-sectional area that is substantially longitudinal, and the third alignment protrusion (54) has a cross-sectional area that is substantially longitudinal. The second alignment protrusion (52) may be oriented differently than the third alignment protrusion (54), or the second alignment protrusion (52) may be oriented substantially the same the third alignment protrusion (54). Preferably, the second alignment protrusion (52) is oriented differently than the third alignment protrusion (54), with the second alignment protrusion (52) being substantially perpendicular in orientation with respect to the third alignment protrusion as shown in FIG. 7B.

The first alignment protrusion (50) can be on the opposite side of the first face of the tray (30) with respect the second alignment protrusion (52) and the third alignment protrusion (54). Alternatively, the first and second alignment protrusions (50, 52) are on the opposite side of the first face of the tray with respect to the third alignment protrusion (54). Preferably, the first alignment protrusion (50) and the first protection tab (251) with the first mating hole is on a same side of the face of the tray (30) with the second alignment protrusion (52) and the second protecting tab (252) with the second mating hole (262) as shown in FIG. 7B. Both the first and second alignment protrusions (50, 54) are on the same side of the face of the tray (30) that lies opposite to the side of the face of the tray (30) that the third protrusion (54) projects therefrom.

As shown in FIG. 5, the tray (30) further includes a fourth alignment protrusion (56). The protection film (23) of FIG. 7B further includes a fourth protection tab (254) wherein the fourth protection tab (254) extends coplanarly from the protection film (23) and wherein the fourth protection tab (254) includes a fourth mating hole (264). The fourth alignment protrusion (56) is constructed to fit in the fourth mating hole (264) of the fourth protection tab (254). Preferably, as shown in FIG. 7B, the first alignment protrusion (50) has cross-sectional area that is substantially circular, the second alignment protrusion (52) has a cross-sectional area that is substantially longitudinal, the third alignment protrusion (54) has a cross-sectional area that is substantially longitudinal, and the fourth alignment protrusion (56) has a cross-sectional area that is substantially longitudinal. As shown in FIG. 7B, the second alignment protrusion (52) is preferably oriented differently from the third and fourth longitudinal protrusions (54, 56), while the third and fourth protrusions (54, 56) are oriented substantially the same. Here, the second alignment protrusion (52) is perpendicular with respect to the third alignment protrusion (54) and the third and fourth alignment protrusions (54, 56) are oriented substantially along a same line. For compactness of the tray (30) of the device (10), a line between the first protrusion (50) and the second protrusion (52) is substantially parallel to a line between the third protrusion (54) and the fourth protrusion (56). The protection film (23) may include more than four protection tabs. Likewise, alignment protrusions projecting from the panel (31) of the tray (30) may be greater than four in number.

As shown in FIG. 6, with respect to any embodiment of the device above, a top ridge (70) may protrude from a top end of the side walls (35) and a recess (71) forms on a bottom end of the side walls (35). The recess (71) is constructed to conform with the top ridge (70) so that multiple devices can be stacked by the recess (71) of one device receiving the top ridge (70) of another. Furthermore, due to the presence of buttons along the sides of a typical electronic device (100), the side walls (35) of the tray (30) comprises at least one indentation structure (38) that substantially fits to the buttons and the side of the electronic device (100) from which the buttons are protruding.

Additionally, the panel (31) of the tray (30) may further include a speaker protrusion (310) sized and shaped to an earphone speaker (120) of the electronic device (100), the earphone speaker (120) that is directed to a user's ear, the protrusion (310) aimed to further position the screen protector unit (20) in a proper orientation and alignment for installation of the screen protector (22) on to the screen (110) of the electronic device (100), and to further secure the screen protector unit (20) to the tray (30). Likewise, the release film (21), the screen protector (22), and the protection film (23) of the screen protector unit (20), as shown in FIGS. 4 and 7A, further include substantially matching openings respective to each other to receive the protrusion (310) on the panel (31) sized and shaped to an earphone speaker (120) of the electronic device (100). These matching openings are a speaker hole (27) formed in the protection film (23), a speaker hole (221) formed in the screen protector (22) and a speaker hole in the release film (21). Preferably, the screen protector (22) and the protection film (23) includes the speaker holes (221, 27) respectively and with the release film (21) having none because the release film (21) is typically removed prior to aligning and placing the electronic device (100) on the tray (30), thus there is no alignment of the electronic device (100) with the release film (21).

Figure 7C:
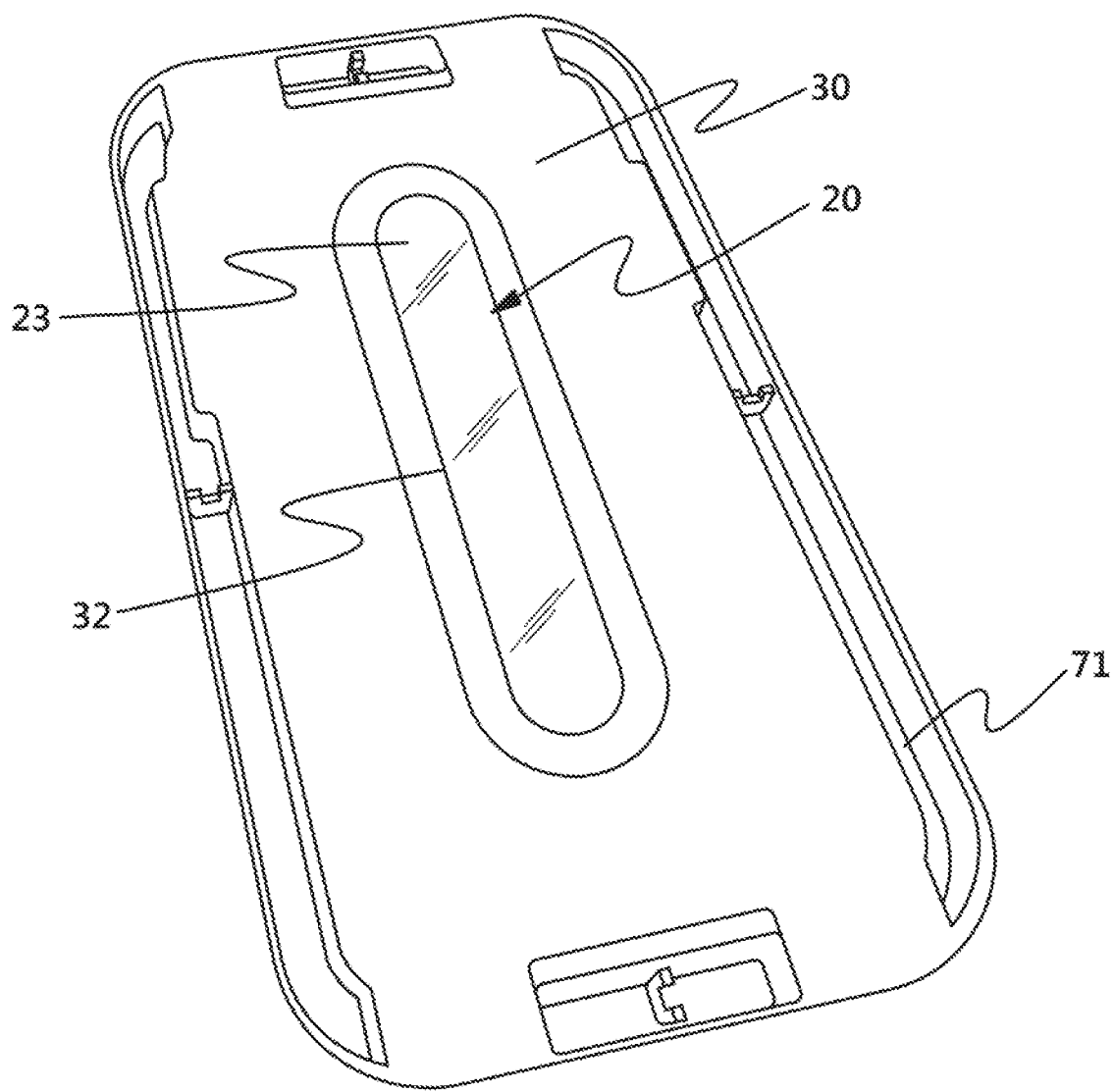
Figure 8:
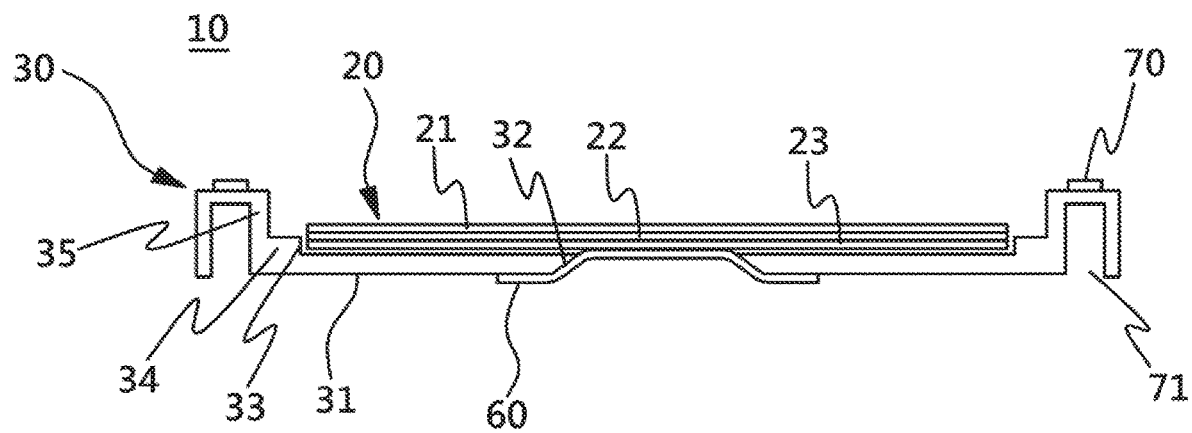
FIG. 8 shows a schematical cross-sectional view of the device.

As shown in FIGS. 7A, 7C and 8, the tray (30) further includes a guide hole (32) constructed to allow an external force to be applied to the screen protector unit (20), more specifically the external force is applied on the protection film (23) of the screen protector unit (20) when the screen protector unit (20) is aligned to and placed upon the tray (30). As shown in FIGS. 7A-B, the guide hole (32) is located on the panel (31) of the tray (30) and a small area of the panel (31) lateral to the edge of the panel (31) that forms the guide hole (32) may be concave. If the edge of the panel (31) forming the guide hole (32) is concave, then the concaved edge is preferred to be on a back side of the panel (31) that is diametrically opposite to a front side that of the panel (31) as shown in FIGS. 7A-B and 8.

Figure 7D:
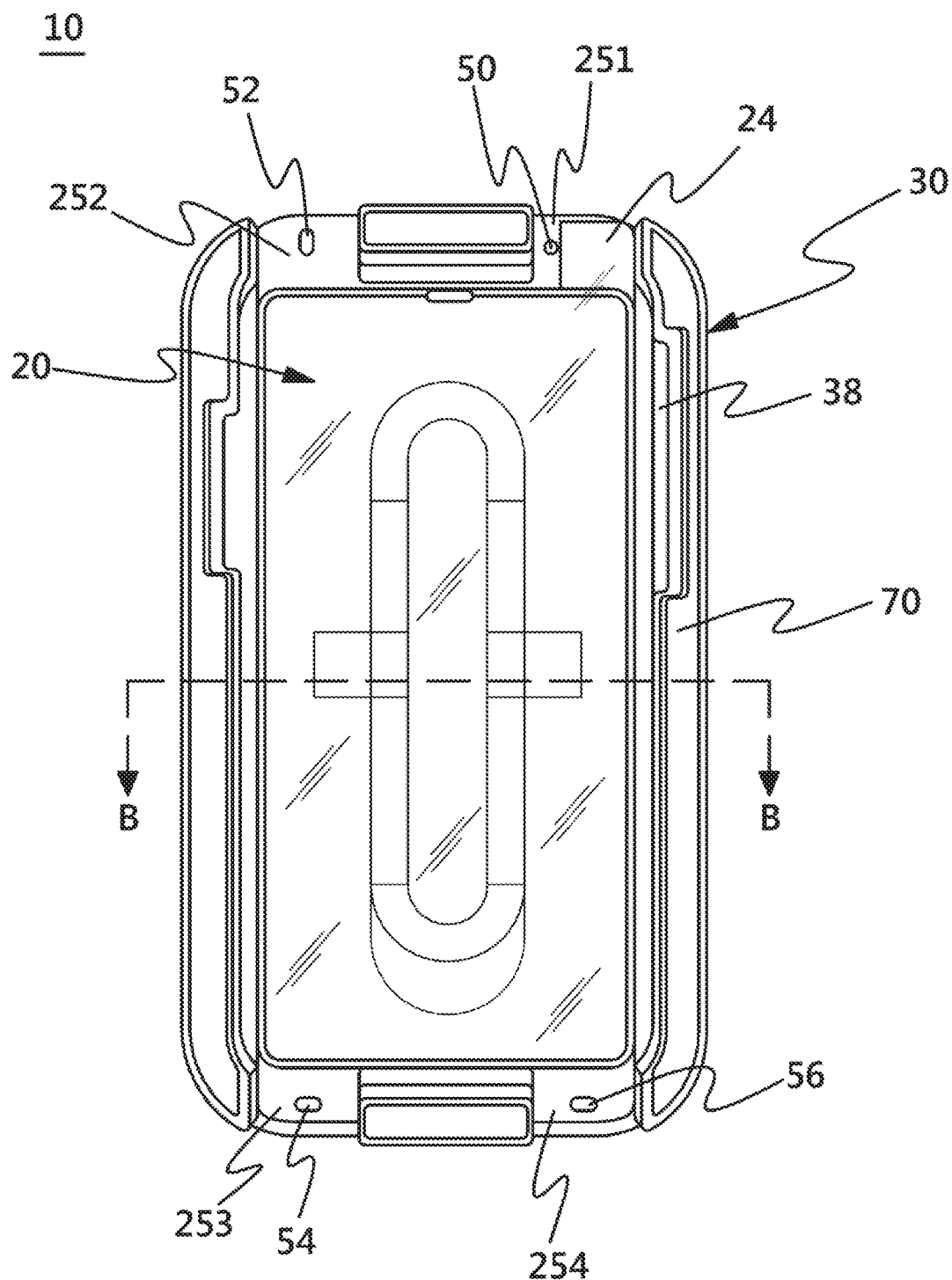
FIGS. 7D-7E show front and rear views of the device respectively.
Figure 7E:
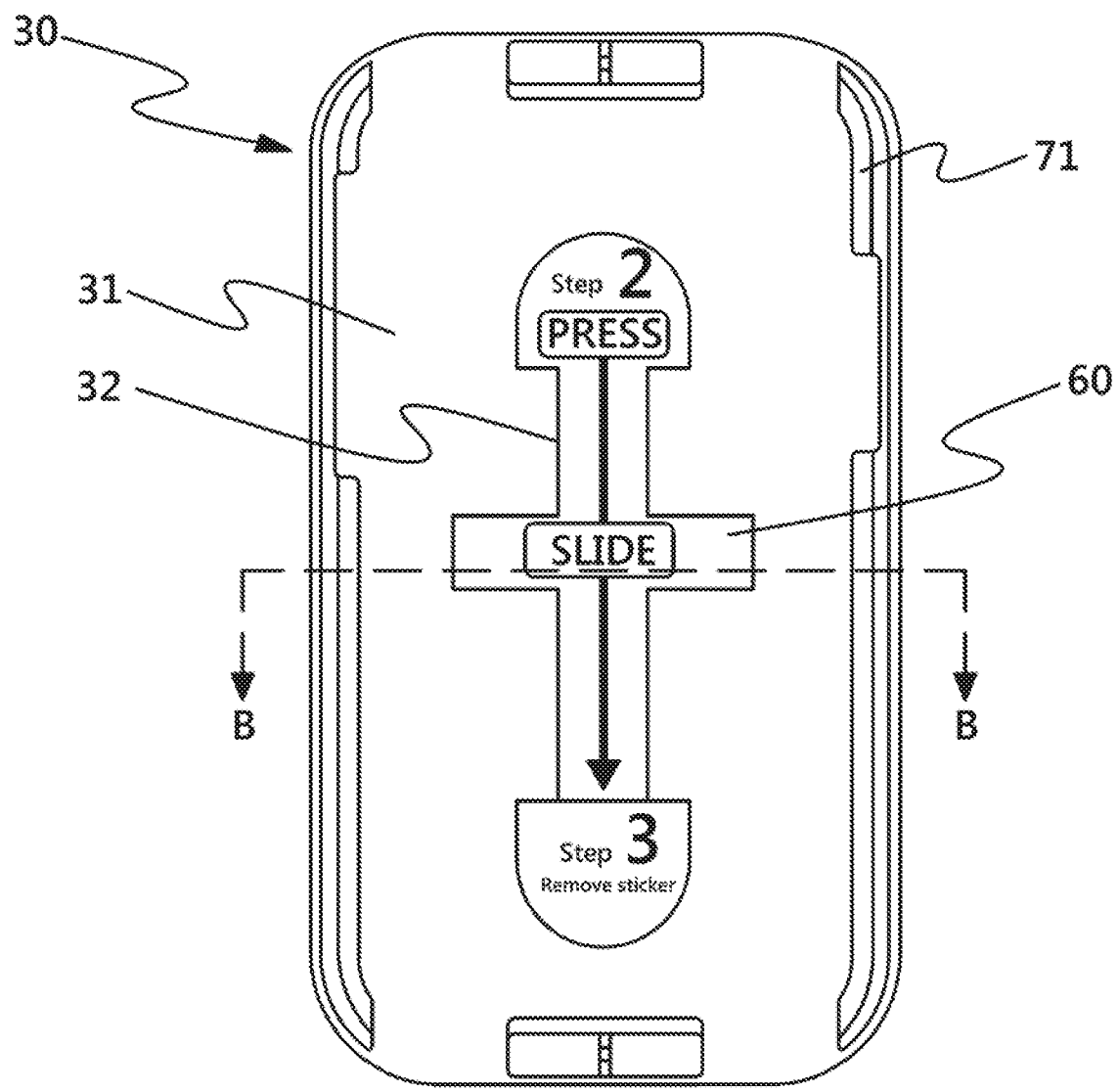
Figure 7F:
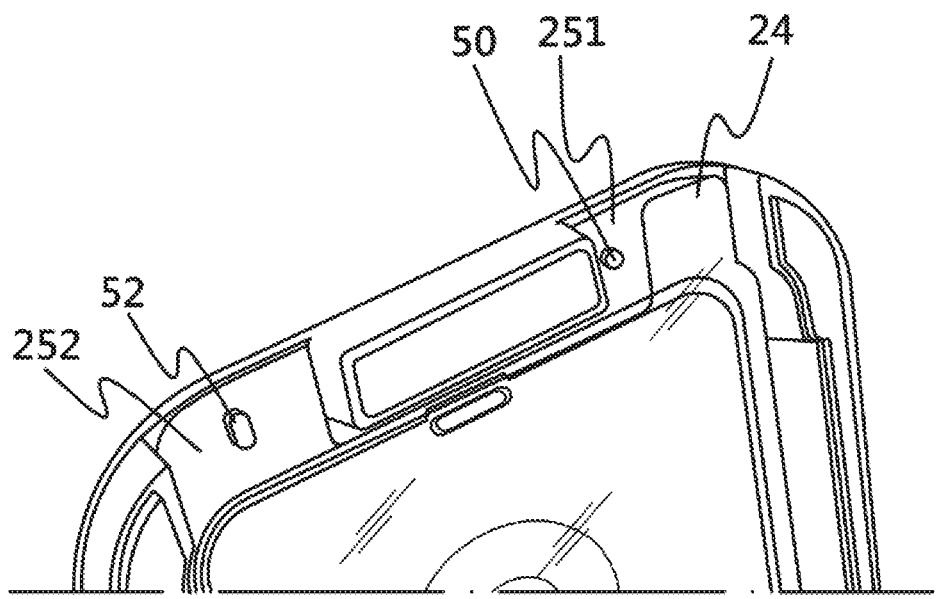
FIGS. 7F-7G show partial perspective views of the device.
Figure 7G:
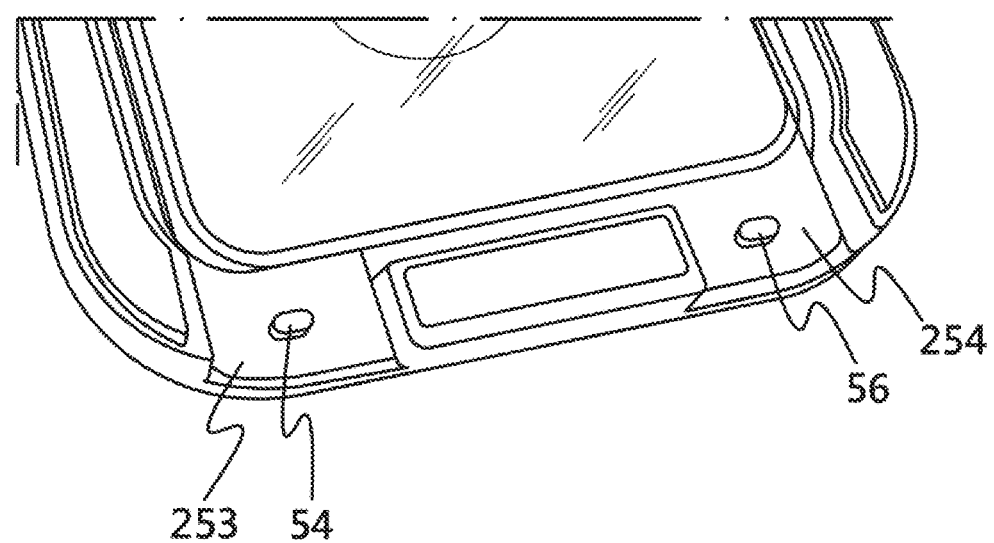

As shown in FIGS. 7D-E and 8, an adhesive strip (60) lies on a back of the tray (30) wherein the adhesive strip (60) detachably attaches to the back of the tray and, through the guide hole (32), to the protection film (23) of the screen protector (20). The screen protector (20) may fall out or be displaced from the tray (30) if the adhesive strip (60) is absent. Thus, the adhesive strip (60) further secures the screen protector (20) to the tray (30) prior to installation and before being released from the protection film (23) and the tray (30) during installation of the screen protector (22) to screen (110) of the electronic device (100).

Figure 9A:
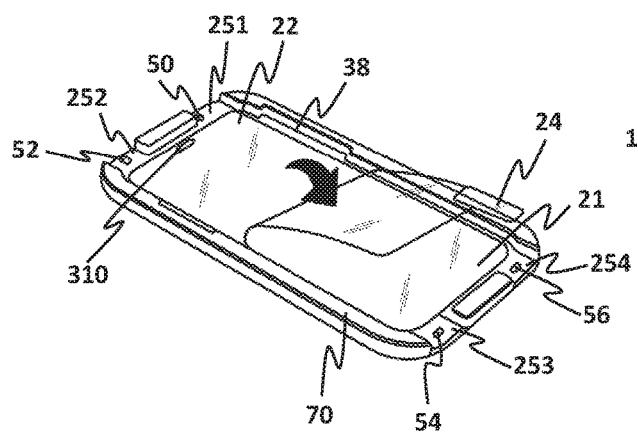
FIG. 9A-D illustrates a method of using the device to install a screen protector to an electronic device.
Figure 9B:
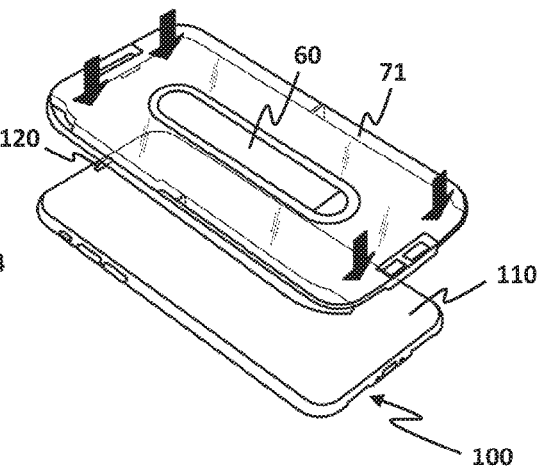
Figure 9C:
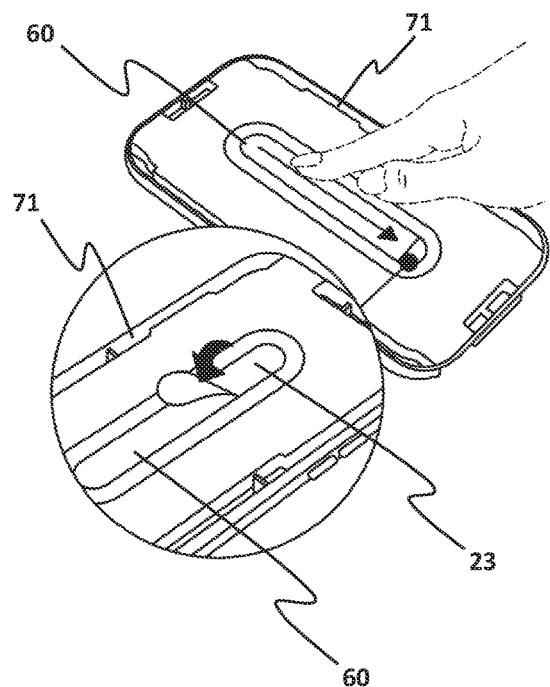
Figure 9D:
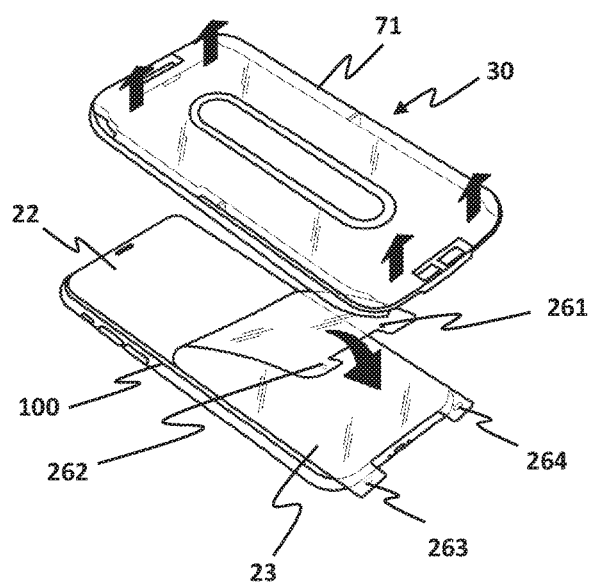

As shown in FIG. 9A-D, a method for using a device (10) to install a screen protector to an electronic device (100), the device (10) including a screen protector unit (20) and a tray (30) wherein the screen protector unit (20) comprises a release film (21) that has at least one release tab (24), a screen protector (22), a protection film (23) having at least one protection tab (251) and at least one mating hole (261) wherein the release film (21) and the protection film (22) are removably attached to opposite sides of the screen protector (22), wherein the first protection tab (251) includes a first mating hole (261), and wherein the tray (30) comprises a panel (31), side walls (35), and a protrusion (50) projecting from the panel (31), the method including the steps of: placing the screen protector unit (20) on the panel (31) of the tray (30), mating the first protrusion (50) with the first mating hole (261) of the first protection tab (251) such that the screen protector unit (20) is aligned and received in tray (31), removing the release film (21) from the screen protector (22) by pulling from the release tab (24) as shown in FIG. 9A, directing the screen protector (22) of the device (10) to a screen (110) of the electronic device (100) as shown in FIG. 9B such that the electronic device (100) is received in the side walls (35) of the tray (30), separating the tray (30) from the protection film (23) as shown in FIG. 9D such that the protection film (23) remains removably attached to the screen protector (22), and using the first protection tab (251) to separate the protection film (23) from the screen protector (22) as shown in FIG. 9D.

Additional steps to the method include applying an external force to the protection film (23), the screen protector (22), and the screen (110) of the electronic device (100) after the directing step and prior to the separating step (e.g. rubbing the protection film (23) that overlays the screen protector (22) and the screen protector (22) that overlays the screen (110) of the electronic device (100)), and pressing down on and throughout the protection film (23) to apply external pressure to the screen protector (22) that lies upon the screen (110) of the electronic device (100) after the separating step and prior to the using step to remove any excess trapped air.

The device (10) used in the method may further include an adhesive strip (60), wherein the tray (30) further comprises a guide hole (32) formed therein. The adhesive strip (60), through the guide hole (32), partially attaches to the screen protector (22) and partially attaches to the panel (31) to keep in place the screen protector unit (20) to the tray (30). The method for the device that further includes the adhesive strip (60) and the guide hole (32) formed in the tray (30) further includes the steps of applying an external force to the adhesive strip (60) as shown in FIG. 9C and the panel (31) overlaying the protection film (23), the screen protector (22), and the screen (110) of the electronic device (100); and detaching the adhesive strip (60) from the panel (31) and the protection film (23) as shown in FIG. 9C, wherein the applying and the detaching steps are after directing step and prior to the separating step.

The method of installing the screen protector (22) using the device (10) may include the step of cleaning the electronic device (100) with liquid wipes and dust removal strips prior to the aligning step. Also, the method may include the step of pressing down on and throughout the protection film (23) to apply external pressure to the screen protector (22) that lies upon the screen (110) of the electronic device (100) prior to the separating step.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A device (10) for installing a screen protector (22) to an electronic device (100), the device (10) comprising:
    a screen protector unit (20) comprising a release film (21), the screen protector (22), and a protection film (23) wherein the release film (21) and the protection film (23) are removably attached to opposite sides of the screen protector (22); and
    a tray (30),
    wherein the tray (30) comprises:
        a panel (31) on which the screen protector unit (20) is placed;
        side walls (35) to help align a screen (110) of the electronic device (100) to the screen protector (22) wherein the side walls (35) are constructed to project from the panel (31) such that the electronic device (100) fits in between the side walls (35); and
        first and second protrusions (50, 52) projecting from the panel (31),
    wherein the protection film (23) includes a first protection tab (251) extending beyond a boundary of the screen protector (22), and a second protection tab (252), and
    wherein the first protection tab (251) includes a first mating hole (261) formed therein such that the first protrusion (50) fits in the first mating hole (261),
    wherein the second protection tab (252) includes a second mating hole formed therein such that the second protrusion (52) fits in the second mating hole (262), and
    wherein the first protrusion (50) and second protrusion (52) are substantially circular and substantially longitudinal respectively, are substantially longitudinal and substantially circular respectively, or are both substantially longitudinal,
    wherein the first protrusion (50) and second protrusion (52) are in different orientations with respect to each other when the first protrusion (50) and the second protrusion (52) are both substantially longitudinal.

2. The device (10) of claim 1, wherein a portion of the side walls (35) is located between the first protrusion (50) and the second protrusion (52), and
    wherein the portion of the side walls (35) is located between the first protection tab (251) and the second protection tab (252) of the screen protector unit (20) when the screen protector unit (20) is placed on the panel (31).

3. The device (10) of claim 1, wherein the tray further comprises a third protrusion (54) projecting from the panel,
    wherein the protection film (23) further includes a third protection tab (253) and wherein the third protection tab (253) includes a third mating hole (263) formed therein such that the third protrusion (54) fits in the third mating hole (263), and
    wherein the third protrusion (54) is either substantially circular or substantially longitudinal.

4. The device (10) of claim 3, wherein the tray (30) further comprises a fourth protrusion (56) projecting from the panel (31),
    wherein the protection film (23) further includes a fourth protection tab (254) and wherein the fourth protection tab (254) includes a fourth mating hole (264) therein such that the fourth protrusion (56) fits in the fourth mating hole (264), and
    wherein the fourth protrusion (56) is either substantially circular or substantially longitudinal.

5. The device (10) of claim 4, wherein a portion of the side walls (35) is located between the first protrusion (50) and the second protrusion (52) and a second portion of the side walls (35) is located between the third protrusion (54) and the fourth protrusion (56),
    wherein the portion of the side walls (35) is located between the first protection tab (251) and the second protection tab (252) of the screen protector unit (20) when the screen protector unit (20) is placed on the panel (31), and
    wherein the second portion of the side walls (35) is located between the third protection tab (253) and the fourth protection tab (254) of the screen protector unit (20) when the panel (31) receives the screen protector unit (20) thereon.

6. The device (10) of claim 4, wherein the first protrusion (50) and the second protrusion (52) are substantially circular and substantially longitudinal respectively, are substantially longitudinal and substantially circular respectively, are both substantially circular, or are both substantially longitudinal,
    wherein the third protrusion (54) and the fourth protrusion (56) are substantially circular and substantially longitudinal respectively, are substantially longitudinal and substantially circular respectively, are both substantially circular, or are both substantially longitudinal, and wherein the first protrusion (50), the second protrusion (52), the third protrusion (54), and the fourth protrusion (56) are in different orientations with respect to each other when the first protrusion (50), the second protrusion (52), the third protrusion (54), and the fourth protrusion (56) are substantially longitudinal.

7. The device (10) of claim 4, wherein the first protrusion (50) and the second protrusion (52) project from one end of panel (31) and the third protrusion (54) and the fourth protrusion (56) project from an opposite end of the panel, wherein the first protrusion (50) is substantially circular and the second protrusion (52) is substantially longitudinal, wherein the third protrusion (54) and the fourth protrusion (56) are both substantially longitudinal and the third and fourth protrusions are oriented substantially same to each other, and wherein the second protrusion (52) is oriented differently from the third and the fourth protrusions.

8. The device (10) of claim 1, wherein the protection film (23) further includes a speaker hole (27) formed therein and wherein the screen protector (22) includes a speaker hole (221) formed therein such that the speaker holes of the screen protector and the protection film (221, 27) substantially align with a speaker (120) of the electronic device (100), wherein the tray (30) further comprises a speaker protrusion (310) projecting therefrom, and wherein the speaker protrusion (310) fits in the speaker holes of the screen protector and the protection film (221, 27) to align the speaker holes of the screen protector and the protection film (221, 27) to the tray (31).

9. The device (10) of claim 1, wherein the device (10) further comprises an adhesive strip (60), wherein the tray (30) further comprises a guide hole (32) formed therein, and wherein the guide hole (32) allows an external force to be applied to the screen protector unit (20) via the adhesive strip (60) when the adhesive strip (60), through the guide hole (32), partially adheres to the protection film (23) of the screen protector unit (20).

10. The device (10) of claim 1, wherein the tray (30) further comprises side ridges (39) to align the screen protector unit (20) to the panel (31) when the screen protector unit (20) is received in the side ridges (39) of the panel (31).

11. The device (10) of claim 1, wherein the tray (30) further comprises a top ridge (70) and a bottom recess (71) to permit stacking with a second tray (30), and wherein the bottom recess (71) of the tray (30) is constructed to receive the top ridge (70) of the second tray (30).

12. The device (10) of claim 1, wherein the tray (30) is substantially translucent or substantially transparent.

13. A method for using a device (10) to install a screen protector to an electronic device (100), the device (10) comprising a screen protector unit (20) and a tray (30) wherein the screen protector unit (20) comprises a release film (21) that has at least one release tab (24), a screen protector (22), a protection film (23) having at least one protection tab (251) and at least one mating hole (261) wherein the release film (21) and the protection film (22) are removably attached to opposite sides of the screen protector (22), wherein the first protection tab (251) includes a first mating hole (261), and wherein the tray (30) comprises a panel (31), side walls (35), and a protrusion (50) projecting from the panel (31), the method comprising the steps of:

placing the screen protector unit (20) on the panel (31) of the tray (30), mating the first protrusion (50) with the first mating hole (261) of the first protection tab (251) such that the screen protector unit (20) is aligned and received in tray (31);

removing the release film (21) from the screen protector (22) by pulling from the release tab (24);

directing the screen protector (22) of the device (10) downwards and placing the screen protector (22) of the device (10) onto a screen (110) of the electronic device (100) when the electronic device (100) is laying substantially flat such that the electronic device (100) is received in the side walls (35) of the tray (30);

separating the tray (30) from the protection film (23) such that the protection film (23) remains removably attached to the screen protector (22); and using the first protection tab (251) to separate the protection film (23) from the screen protector (22).

14. The method of claim 13 further comprising the steps of:

applying an external force to the protection film (23), the screen protector (22), and the screen (110) of the electronic device (100) after the directing step and prior to the separating step; and pressing down on and throughout the protection film (23) to apply external pressure to the screen protector (22) that lies upon the screen (110) of the electronic device (100) after the separating step and prior to the using step to remove any excess trapped air.

15. The method of claim 13, wherein the device (10) further comprises an adhesive strip (60), wherein the tray (30) further comprises a guide hole (32) formed therein, and wherein the adhesive strip (60), through the guide hole (32), partially attaches to the screen protector (22) and partially attaches to the panel (31) to keep in place the screen protector unit (20) to the tray (30).

16. The method of claim 15 further comprising the steps of:

applying an external force to the adhesive strip (60) and the panel (31) overlaying the protection film (23), the screen protector (22), and the screen (110) of the electronic device (100); and detaching the adhesive strip (60) from the panel (31) and the protection film (23), wherein the applying and the detaching steps are after directing step and prior to the separating step.

17. A device (10) for installing a screen protector (22) to an electronic device (100), the device (10) comprising:

a screen protector unit (20) comprising a release film (21), the screen protector (22), and a protection film (23) wherein the release film (21) and the protection film (23) are removably attached to opposite sides of the screen protector (22); and a tray (30), wherein the tray (30) comprises:

a panel (31) on which the screen protector unit (20) is placed;

side walls (35) to help align a screen (110) of the electronic device (100) to the screen protector (22) wherein the side walls (35) are constructed to project from the panel (31) such that the electronic device (100) fits in between the side walls (35); and first and second protrusions (50, 52) projecting from the panel (31), wherein the protection film (23) includes a first protection tab (251) extending beyond a boundary of the screen protector (22), and a second protection tab (252), and wherein the first protection tab (251) includes a first mating hole (261) formed therein such that the first protrusion (50) fits in the first mating hole (261), wherein the second protection tab (252) includes a second mating hole formed therein such that the second protrusion (52) fits in the second mating hole (262), and wherein the first protrusion (50) and second protrusion (52) are oriented differently from each other.

18. The device (10) of claim 17, wherein the tray further comprises third and fourth protrusions (54, 56) projecting from the panel, and wherein the protection film (23) further includes third and fourth protection tabs (253, 254), wherein the third and fourth protrusions (56) are either substantially circular or substantially longitudinal, wherein the third protection tab (253) includes a third mating hole (263) formed therein such that the third protrusion (54) fits in the third mating hole (263), and wherein the fourth protection tab (254) includes a fourth mating hole fourth mating hole (264) therein such that the fourth protrusion (56) fits in the fourth mating hole (264).

19. The device (10) of claim 17, wherein the tray further comprises third and fourth protrusions (54, 56) projecting from the panel, and wherein the protection film (23) further includes third and fourth protection tabs (253, 254), wherein the third and fourth protrusions (56) are oriented differently from each other, wherein the third protection tab (253) includes a third mating hole (263) formed therein such that the third protrusion (54) fits in the third mating hole (263), and wherein the fourth protection tab (254) includes a fourth mating hole fourth mating hole (264) therein such that the fourth protrusion (56) fits in the fourth mating hole (264).

\* \* \* \* \*